Sept. 28, 1937.  E. G. GARTIN  2,094,400
ROCK DRILL
Filed Sept. 3, 1935
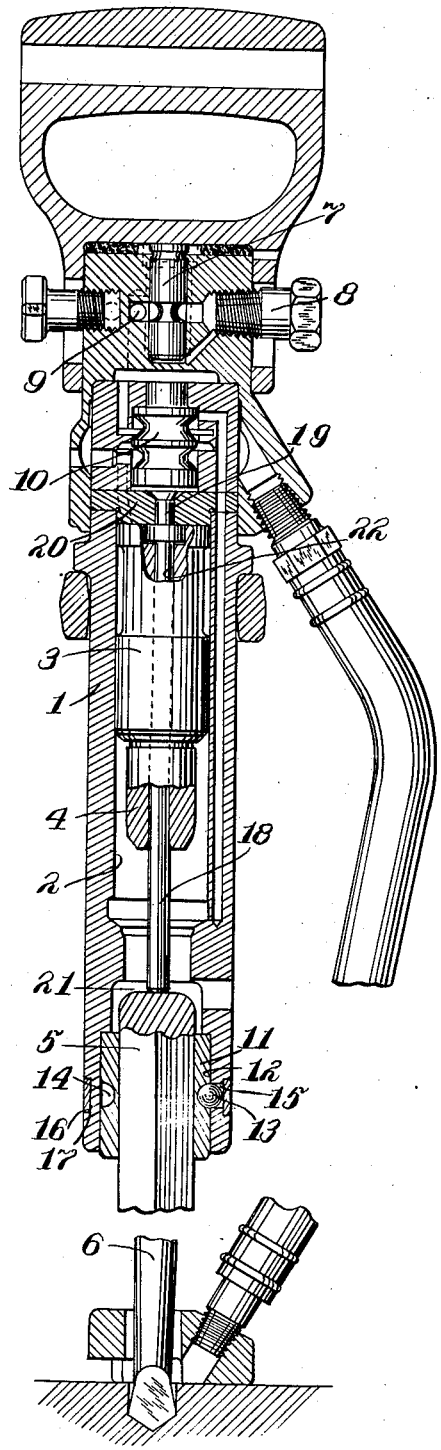
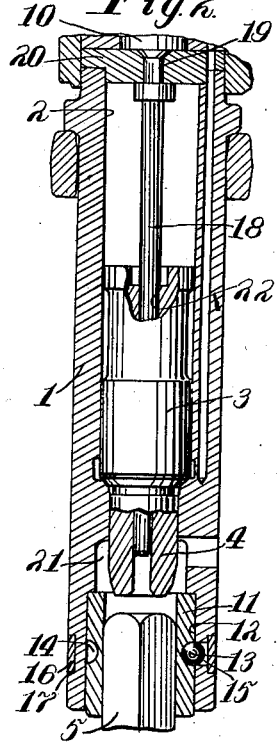
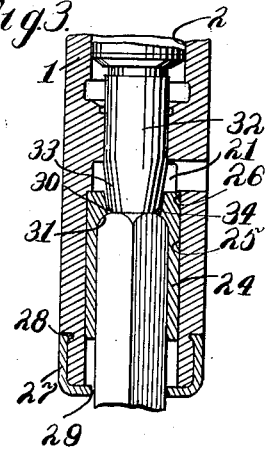
Inventor:
Elmer G. Gartin.
by Louis A. Maxson
Att'y.

Patented Sept. 28, 1937

2,094,400

UNITED STATES PATENT OFFICE 2,094,400

ROCK DRILL

Elmer G. Gartin, Claremont, N. H., assignor to Sullivan Machinery Company, a corporation of Massachusetts Application September 3, 1935, Serial No. 38,868

6 Claims. (Cl. 121—31)

This invention relates to rock drills, and more particularly to improvements in the chuck mechanism of a rock drill of the hammer type.

An object of this invention is to provide an improved rock drill chuck mechanism, whereby a lugless or collarless drill steel may be operated in the chuck of a conventional rock drill. Another object is to provide an improved rock drill chuck mechanism having embodied therein improved stop means for limiting inward movement of the drill steel shank within the chuck. Yet another object is to provide an improved stop rod with which the drill steel shank is engageable for limiting inward movement of the drill steel within the chuck. These and other objects of the invention will, however, hereinafter more fully appear.

In the accompanying drawing there are shown for purposes of illustration two forms which the invention may assume in practice.

In this drawing,—

Fig. 1 is a view in longitudinal section showing a hammer rock drill having embodied therein one illustrative form of the improved chuck mechanism.

Fig. 2 is a fragmentary view taken in the plane of Fig. 1 showing the hammer piston and drill steel shank in a different position.

Fig. 3 is a fragmentary view taken in the plane of Fig. 1 showing a modified form of construction.

In this illustrative construction, both forms of the improved chuck mechanism are shown incorporated in a hammer rock drill of the pressure fluid actuated type comprising a cylinder 1 having a bore 2 containing a reciprocatory hammer piston 3. The hammer piston has a striking nose 4 for delivering the impact blows of the hammer piston to the shank 5 of a usual drill steel 6. The fluid distribution system for supplying pressure fluid to the motor cylinder to effect reciprocation of the hammer piston is of a conventional design comprising a throttle valve 7 for controlling the flow of pressure fluid from a supply connection 8 to a supply passage 9, and an automatic fluid distributing valve 10 controls the supply of pressure fluid from the passage 9 through suitable ports and passages to the opposite cylinder ends, and this valve 10 also controls the exhaust of fluid from the motor cylinder.

In the illustrative embodiment of the invention shown in Figs. 1 and 2, the shank of the drill steel 6 is supported in a chuck 11 mounted in a bore 12 formed within the forward portion of the motor cylinder and retained therein by means of a ball lock 13 projecting within an annular recess 14 formed in the chuck and held in position within a radial opening 15 in the cylinder by an annulus 16 seated in a groove 17 surrounding the exterior cylinder periphery. The drill steel 6 is herein of the solid lugless or collarless type, and movement of the drill steel in a rearward direction within the chuck 11 is limited by a stop rod 18. The rod 18 is rigidly fixed at 19 within the rear head plate 20 of the motor cylinder and extends centrally through the cylinder bore, and terminates at its forward end within a chamber 21 within which the rear end of the drill steel shank is adapted to project in position to receive the impact blows of the hammer piston. The stop rod extends centrally through an axial bore 22 in the hammer piston. The rear end of the drill steel shank 5 engages the inner end of the stop rod when the parts are in the position shown in Fig. 1, and when the hammer piston strikes its blow on the drill steel shank, the steel shank moves away from the stop rod, as shown in Fig. 2.

In the modified form of construction shown in Fig. 3, the drill steel 5 is supported in a chuck 24 reciprocably and rotatably mounted in a bore 25 within the forward portion of the cylinder 1. A shoulder 26 provides a stop for limiting rearward movement of the chuck within the bore while the chuck is retained against axial displacement forwardly from the bore by a cupshaped retaining member 27 surrounding the forward portion of the cylinder and secured thereto by an annular flange 28 seated in an annular groove on the cylinder periphery. The drill steel shank extends through an opening 29 in the member 27 and is supported within the chuck. The chuck 24 is formed with an annular stop collar 30 providing an annular abutment surface 31 with which the rear end of the drill steel shank is engageable. In this construction, the hammer piston is provided with an elongated striking nose 32 having a tapered forward end 33 adapted to enter a conical bore 34 formed in the chuck sleeve, the tapered portion of the piston striking nose adapted to project within the bore 34 into engagement with the rear end of the drill steel shank. As the striking nose of the hammer piston moves rearwardly away from the drill steel, the stop collar prevents movement of the drill steel shank within the cylinder bore, and when the piston striking nose strikes against the drill steel shank to drive the steel forwardly, the chuck moves forwardly within the chuck bore.

It will thus be seen that the improved stop means associated with the drill steel chuck mechanism provides limit means for limiting inward movement of the drill steel within the steel chuck, thereby preventing movement of the drill steel shank within the motor cylinder bore. It will be evident that the stop rod, by its particular manner of mounting, provides an extremely simple means for limiting steel movement without impeding movement of the drill steel and piston during the drilling operation. It will further be evident that an improved stop collar arrangement is provided, which eliminates the special stop rod structure but which necessitates some change in the piston design. It will further be evident that both the improved stop rod or stop collar structures are of an extremely simple and rugged design which may be applied to a conventional rock drill with a minimum of change. Other advantages of the invention will be clearly apparent to those skilled in the art.

While there are in this application specifically described two forms which the invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. In a hammer rock drill, a cylinder, a piston reciprocable therein, a chuck for supporting a drill steel in position to receive impact blows of the piston, a drill steel supported within said chuck and having a shank adapted to receive the impact blows of said piston, and means extending centrally through the cylinder and with which the rear end of the drill steel shank is adapted to abut for limiting inward movement of the steel within the chuck, said means rigidly fixed against movement with respect to said cylinder.

2. In a hammer rock drill, a cylinder, a piston reciprocable therein, a chuck for supporting a drill steel in position to receive impact blows of the piston, a drill steel supported within said chuck and having a shank adapted to receive the impact blows of said piston, and stop means extending centrally through the cylinder and provided with a forward abutment surface with which the rear end of the drill steel shank is adapted to abut for limiting inward movement of the steel within the chuck, said stop means rigidly fixed against movement with respect to said cylinder.

3. In a rock drill, a cylinder having a bore, a piston reciprocable therein, a chuck for supporting a drill steel in position to receive impact blows of the piston, a drill steel supported within said chuck and having a shank adapted to receive the impact blows of said piston, and a stop rod rigidly fixed against movement with respect to said cylinder and extending centrally through the cylinder bore, said stop rod providing a forward abutment surface with which the rear end of the drill steel shank is adapted to abut for limiting inward movement of the steel within the chuck.

4. In a hammer rock drill, a cylinder having a rear head, a piston reciprocable in said cylinder, a chuck for supporting a drill steel in position to receive the impact blows of the piston, a drill steel supported within said chuck and having a shank adapted to receive the impact blows of said piston, and a stop rod rigidly fixed against movement with respect to said cylinder and fixed to the rear cylinder head and extending forwardly through an axial bore in the piston with its forward end in a position to provide an abutment surface with which the rear end of the drill steel shank is adapted to abut for limiting inward movement of the steel within the chuck.

5. In a hammer rock drill, a cylinder, a piston reciprocable therein and having an axial bore, a chuck for supporting a drill steel in position to receive impact blows of the piston, a drill steel supported within said chuck and having a shank adapted to receive the impact blows of said piston, and means extending centrally through the piston bore and with which the rear end of the drill steel shank is adapted to abut for limiting inward movement of the steel within the chuck, said means rigidly fixed against movement with respect to said cylinder.

6. In a hammer rock drill, a cylinder, a piston reciprocable therein and having an axial bore, a chuck for supporting a drill steel in position to receive impact blows of the piston, a drill steel supported within said chuck and having a shank adapted to receive the impact blows of said piston, and stop means extending centrally through the piston bore and provided with a forward abutment surface with which the rear end of the drill steel shank is adapted to abut for limiting inward movement of the steel within the chuck, said stop means rigidly fixed against movement with respect to said cylinder.

ELMER G. GARTIN.